United States Patent [19]

Freudenschuss

[11] 4,065,209

[45] Dec. 27, 1977

[54] CASSETTE REWIND STOP CONTROL FOR A MOVIE CAMERA

[75] Inventor: Otto Freudenschuss, Vienna, Austria

[73] Assignees: Karl Vockenhuber; Raimund Hauser, both of Vienna, Austria

[21] Appl. No.: 671,549

[22] Filed: Mar. 29, 1976

[30] Foreign Application Priority Data

Mar. 28, 1975 Austria .................................. 2408/75

[51] Int. Cl.² ............................................. G03B 23/02
[52] U.S. Cl. .................................... 352/72; 352/91 C
[58] Field of Search ...................... 352/72, 91 R, 91 C, 352/91 S; 242/194, 198

[56] References Cited

U.S. PATENT DOCUMENTS

| 3,860,195 | 1/1975 | Holzhauser | 352/72 |
| 3,945,719 | 3/1976 | Iida | 352/72 |

OTHER PUBLICATIONS

Defensive Publication T920009, Kosarko, Mar. 1974, 352-372.

*Primary Examiner*—Monroe H. Hayes
*Attorney, Agent, or Firm*—Fleit & Jacobson

[57] ABSTRACT

The invention is directed to a movie camera that is designed for loading with at least two different types of cassettes both of which are designed for accommodation together within the interior of the camera but which are provided with exterior configurations that are characteristic of each type of cassette, while additionally, at least one of the two types of cassettes is provided with a releasable rewind stop for at least one of the two reels of film contained in the cassette as well as being provided with a device for effecting the release of the rewind stop which is controlled by an actuating member supported on the camera.

4 Claims, 1 Drawing Figure

U.S. Patent     Dec. 27, 1977     4,065,209
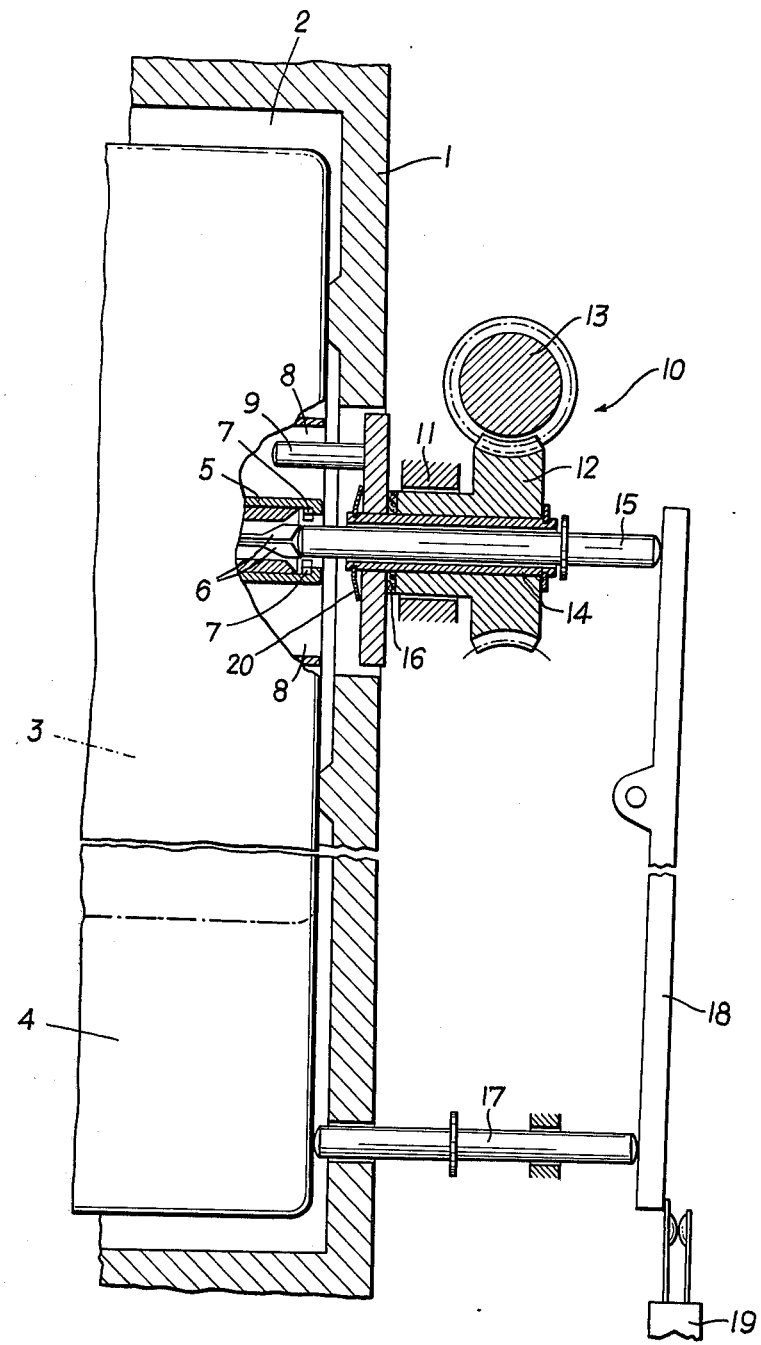

CASSETTE REWIND STOP CONTROL FOR A MOVIE CAMERA

BACKGROUND OF THE INVENTION

Cassettes that have a rewind stop for a film take-up reel inside the cassette have been available on the market for a long time. These rewind stops have an advantage in that the exposed roll of film cannot open by itself when the cassette has been taken out of the camera which would cause the last exposed picture to lose its sharpness. However, they have certain disadvantages in that expensive processing steps are necessary in making film fade-outs and fade-ins, and complicated devices must be provided within the camera so as to move the film in the reverse direction past the image aperture regardless of the rewind stop.

Recently, cassettes have become available which are provided with means for releasing the rewind stop thereby making possible the provision of a simple camera design with which fade-outs and fade-ins can be taken. In such cassettes, the device for the release of the rewind stop is coaxial with the take-up pin and generally consists of a rigid jack arrangement and of a notch that may be rotated with the take-up pin. These cassettes differ from other cassettes not only by the inclusion of the device for the release of the rewind stop but by the fact that they have larger outer dimensions.

Well known cameras that may be loaded with both types of cassettes have a spring that acts yieldingly against the release jacks of the device for releasing the rewind stop. During the operation of the camera with a cassette having a releasable rewind stop, the pin shifts the release jacks out of the path of the notch through the tension of the spring making it possible to rewind the film in the camera at will. However, when a cassette without a releasable rewind stop has been placed in the camera, the pin will press directly on the take-up pin rotating in the cassette which is located in the area where the jacks would be located thereby impeding the winding of the film and also placing an additional strain on the camera drive motor. As a result, the life of the batteries of the camera motor is shortened and the exposed film is taken up without any definition.

SUMMARY OF THE INVENTION

It is the purpose of the invention to eliminate these aforementioned disadvantages and that purpose is achieved by providing an actuating member which may be moved into an operative position wherein it actuates the device for releasing the rewind stop lock on the cassette, and into an inoperative position in which the actuating member is withdrawn from the rewind stop release device while the camera is provided with a scanner lying opposite the surface portions that are characteristic of the various types of cassettes. Upon insertion of a cassette of the first type in the camera, the scanner shifts the actuating member, preferably in a locking action, into the operative position and upon insertion of a cassette of the second type, the actuating member is released for the second inoperative position. Thus, no adjustment is required by the operator.

In one simple embodiment of the invention, a movie camera is arranged to accommodate a cassette of a first type which cassette is provided with a device for releasing the rewind stop in the center of a coupling element on the cassette used to drive the take-up reel. The first type of cassette has one dimension larger than a cassette of a second type which is not provided with a device for releasing the rewind stop and which is also arranged to be accommodated within the camera. A coupling on the side next to the camera is provided with a hollow shaft for driving the film wind coupling element of the cassette and an axially displaceable pin is disposed within the hollow shaft. The camera also includes a scanner which is arranged to extend inside that portion of the camera interior which is occupied only by the first type of scanner together with an actuating member between the scanner and the aforementioned pin.

BRIEF DESCRIPTION OF THE DRAWING

Additional advantages and characteristics of the invention follow from the description of the embodiment shown in the drawings.

The single FIGURE in the drawing is a side elevation view of a portion of a movie camera, partially in section, incorporating the invention.

DESCRIPTION OF THE PREFERRED EMBODIMENTS

Referring now to the drawing, there is shown a portion of a movie camera having a casing 1 provided with an interior space 2 into which cassettes 3 or 4 of a second and first type respectively may be inserted. The cassette 3 which is shorter than cassette 4 as indicated by the broken lines, is identical with a cassette shown and described in German Auslegeschrift No. 1,255,483 and has, for the reasons referred to above, a rewind stop, not shown in any detail in the drawing, for its take-up pin.

A cassette corresponding to cassette 4 is shown and described in German Offenlegungsschrift No. 2,309,758. While cassette 4 also has a rewind stop, that stop may be disconnected at will. The rewind stop itself comprises two tongues 6 which are not rotatable but which may be displaced axially along the rotating axis of the cassette take-up pin 5. The tongues 6 are axially movable into the path of projections 7 by means of a spring not shown in the drawing. Projections 7 are formed integrally with the take-up pin 5 and permit the take-up pin to rotate in the film take-up direction but to lock the pin 5 by means of the tongues 6 against rotation in the unwind direction.

The take-up pin 5 is provided with at least one rib 8 which is engaged by a pin 9 of a drive mechanism designated generally by the numeral 10 and supported on the side of the camera as shown. This drive mechanism largely consists of a worm gear 12 rotatably supported in bearing 11, and meshing with an endless worm 13 connected to a driving motor (not shown). The worm gear 12 is press-fitted onto a hollow shaft 14 in which a pin 15 is mounted so as to be axially displaceable therein. The drive mechanism 10 also includes a friction disc 16 by means of which torque is transmitted from the worm gear 12 to a disc on which the pin 9 is mounted, coupling of the disc to the worm gear 12 being accomplished by a cup spring 20.

When the cassette 3 is inserted in the camera space 2, a scanner 17 supported on the camera casing 1 as shown, remains unshifted from a position in which it projects into the space 2 to the left of the position shown in the drawing since it is not contacted by the cassette 3. In this position of scanner 17, the pin 15 is disposed in a retracted, inoperative position to the right of the position shown in the drawing in which it is removed from space 2 and does not rest against the take-up pin 5 mounted on cassette 3 in the same location as on cassette 4. In this way, there is no impeding of film take-up nor is there any added strain imposed on the camera drive motor.

When cassette 4 is inserted, an extension of its body, as shown by the solid lines in the drawing, engages the scanner or key 17 which is thereby moved into the position shown in the drawing and this axial shifting movement of scanner 17 is transmitted to pivotally mounted lever 18 which is housed in the cassette casing. This lever 18 is thus pivoted counterclockwise against one end of pin 15, displacing pin 15 in the direction of take-up 5 as shown in the drawing. At the same time, tongues 6 will be moved axially out of the path of the projections 7 as shown in the drawing, so that the take-up pin 5 can now be driven in both directions by pin 9 and rib 8.

A switch 19 is also provided which is operatively associated with a camera control unit for the cassette 4. For instance, if cassette 4 is a sound cassette, switch 19 may be connected with a sound-recording amplifier, a driving spindle motor or the like. Movement of the scanner 17 into the position shown in the drawing, closes switch 19 to thereby actuate the associated control unit.

What is claimed is:

1. A movie camera of the type arranged to accommodate two different types of cassettes having surface portions characteristic of each type, at least one of the cassettes having a releasable rewind stop for at least one of the two film spools in the cassette, comprising, in combination, means for releasing the rewind stop on the one cassette, an actuating member movable between an operative position for actuating said rewind stop releasing means and an inoperative position for deactuating said rewind stop releasing means, a movably mounted scanner operatively associated with said actuating member for engagement by a cassette of a first type inserted into the camera, said scanner being movable into one position by insertion of a cassette of the first type in the camera to move said actuating member into said operative position for actuating said rewind stop releasing means for releasing the cassette rewind stop and into a second position upon insertion of a cassette of the second type into the camera to release said actuating member from said operative position into said inoperative position for deactuating said rewind stop releasing means.

2. A movie camera in accordance with claim 1 wherein the cassette of the first type is provided with a rewind stop and a coupling element for a film take-up drive mechanism and wherein said rewind stop is disposed centrally within said coupling element in association with the cassette of the first type only, the cassette of the first type having one exterior dimension greater than the corresponding exterior dimension of the cassette of the second type, a coupling drive means, including a hollow shaft, for driving engagement with said coupling element on the cassette of the first type and wherein said rewind stop releasing means includes a pin disposed for axial movement within said hollow shaft, said scanner being arranged to extend in said second position into the space within the camera to be occupied by the cassette of the first type and wherein said actuating member comprises a pivotally mounted lever having opposite ends engageable with said pin and scanner respectively.

3. A movie camera in accordance with claim 1 including a control switch operatively connected to apparatus associated with the camera and wherein said scanner is arranged to operatively condition said control switch during said movement between said first and second positions.

4. A movie camera as claimed in claim 1 further comprising a coupling drive means for driving said first or second cassette, including a hollow shaft, said rewind stop releasing means comprises a pin disposed for axial movement within said hollow shaft, said pin movable by said actuating member into engagement with a cassette of the first type, when a cassette of the first type is inserted into said camera, said pin remaining disengaged from a cassette of the second type when a cassette of the second type is inserted into said camera.

* * * * *